(12) United States Patent
Shinotsuka et al.

(10) Patent No.: US 6,909,462 B1
(45) Date of Patent: Jun. 21, 2005

(54) PHOTOSENSOR CIRCUIT CAPABLE OF DETECTING MINUTE LIGHT SIGNAL IN HIGH PRECISION AND IMAGE SENSOR UTILIZING PHOTOSENSOR CIRCUIT

(75) Inventors: Sukeyuki Shinotsuka, Wako (JP); Nobuhiro Fueki, Fujimi (JP); Tomoyuki Kamiyama, Kawaguchi (JP); Toshio Imai, Tokorozawa (JP); Toshiaki Tanaka, Tokorozawa (JP)

(73) Assignees: Honda Giken Kogko Kabushiki Kaisha, Tokyo (JP); Citizen Tokei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/268,344

(22) Filed: Mar. 16, 1999

(30) Foreign Application Priority Data

Mar. 18, 1998 (JP) ............................. 10-067979

(51) Int. Cl.$^7$ ............................ H04N 3/14; H04N 5/335
(52) U.S. Cl. ..................................................... 348/308
(58) Field of Search ....................... 348/308; 250/208.1

(56) References Cited

U.S. PATENT DOCUMENTS

| 5,539,461 | A | * | 7/1996 | Andoh et al. ............... 348/308 |
| 5,650,643 | A | * | 7/1997 | Konuma ..................... 348/310 |
| 5,861,621 | A | * | 1/1999 | Takebe et al. .............. 348/297 |
| 5,880,460 | A | * | 3/1999 | Merrill ....................... 348/308 |
| 5,903,021 | A | * | 5/1999 | Lee et al. ................... 257/292 |
| 6,184,055 | B1 | * | 2/2001 | Yang et al. ................. 257/292 |
| 6,242,728 | B1 | * | 6/2001 | Merrill et al. ............ 250/208.1 |

* cited by examiner

Primary Examiner—Wendy R. Garber
Assistant Examiner—Jason Whipkey
(74) Attorney, Agent, or Firm—Westerman, Hattori, Daniels & Adrian, LLP

(57) ABSTRACT

A photosensor circuit comprises a photodiode PD, which converts a light signal into electricity, an n-channel MOS transistor QD1 which has a logarithmic characteristic in its weakly reversed condition and converts a sensor current generated by the photodiode PD into a detection voltage which has a logarithmic characteristic, and a capacitor which is connected to a detection terminal of this transistor QD1. A resetting voltage VG=VS is applied to the gate G of the transistor QD1 to lower the impedance between the drain and the source of the transistor for resetting the transistor to an initial condition. As the n-channel MOS transistor QD1 is a depletion type n-channel MOS transistor, when this transistor QD1 does not receive any gate voltage, the transistor stays in a weakly reversed condition and has a logarithmic characteristic. This photosensor circuit has a high SN ratio and is capable of detecting minute light signals in high precision. Furthermore, it shows no after-image phenomenon and requires a relatively small number of power sources.

10 Claims, 8 Drawing Sheets

PHOTOSENSOR CIRCUIT CAPABLE OF DETECTING MINUTE LIGHT SIGNAL IN HIGH PRECISION AND IMAGE SENSOR UTILIZING PHOTOSENSOR CIRCUIT

FIELD OF THE INVENTION

The present invention generally relates to a photosensor circuit which provides a sensor output that is generated in correspondence to the intensity of the incident light and an image sensor which utilizes such photosensor circuits; and more particularly to a photosensor circuit which has a wide dynamic range, a high sensitivity and a relatively small number of power sources and an image sensor which utilizes such photosensor circuits.

BACKGROUND OF THE INVENTION

MOS type and CCD type image sensors, which incorporate photosensors in matrix, have been in use. Such an image sensor utilizes the electrical charges which are generated in the photosensors exposed to incident light (i.e., incoming light) referred as "light signal". For example, when a CCD image sensor is exposed, electrical charges are generated and accumulated in the photosensor circuits of the image sensor, and these charges are used as "light signals" to capture an image electronically. In a MOS image sensor, the junction portions of the photodiodes composing photosensor circuits are electrically charged prior to exposure to light, and the amounts of the electrical charges discharged during the exposure are measured as light signals when the photodiodes are recharged.

For the purpose of widening the dynamic range in the detection of light signals, a photosensor circuit which includes a field-effect transistor (FET, e.g., enhancement type n-channel MOS transistor) has been developed. In this photosensor circuit, an FET is connected in series with a photodiode so that the circuit functions to logarithmically compress the output voltage of the photosensor circuit. This function relies on the characteristics of the FET whose resistance changes logarithmically while the electrical current flowing therethrough is relatively small.

FIG. 6 shows such a photosensor circuit. This photosensor circuit 100 comprises a photodiode PD, an enhancement type n-channel MOS transistor Q1 connected in series with the photodiode PD,.an enhancement type n-channel MOS transistor Q2 whose.gate is connected to the junction point P (sensor detection terminal) of the photodiode PD and the enhancement type n-channel MOS transistor Q1, and an enhancement type n-channel MOS transistor Q3 connected in series with this enhancement type n-channel MOS transistor Q2. In addition, a capacitor C is connected to the junction point P. The parasitic capacitance of this capacitor is a composite value of stray capacitance created in the photodiode PD, the enhancement type n-channel MOS transistors Q1 and Q2 and the wires which interconnect these components.

A light signal Ls is detected at the photodiode PD and converted to a sensor current Id whose magnitude is proportional to the intensity of the light signal Ls. The enhancement type n-channel MOS transistor Q1, which acts as a load for the photodiode PD, converts the sensor current Id generated by the photodiode PD to a corresponding voltage which is detectable at the sensor detection terminal P as detection voltage Vd.

In this condition, the enhancement type n-channel MOS transistor Q1 in its weakly reversed condition while the sensor current Id is relatively small, provides a MOS transistor resistance that has a logarithmic characteristic, such that the sensor current Id is converted to the detection voltage Vd in accordance with a logarithmic function. Therefore, even if the light signal Ls changes greatly, thereby changing the sensor current Id greatly (in an exponential magnitude), the change of the detection voltage Vd is kept relatively small, and this logarithmic conversion never experiences saturation. As a result, the dynamic range of the output is substantially wide with respect to the range of the input intensity.

Furthermore, the enhancement type n-channel MOS transistor Q2, which defines an output transistor, performs a voltage-current conversion through which the detection voltage Vd is output from the photosensor circuit 100 as a sensor current signal. The enhancement type n-channel MOS transistor Q3 functions as a switch to connect or cut the line of this sensor current signal, which is generated at the enhancement type n-channel MOS transistor Q2, to an external circuit.

Now, a description is made of the operation of this conventional photosensor circuit. As the drain D and the gate G of the enhancement type n-channel MOS transistor Q1 are connected to a common power supply VD (e.g., 5 volts), a charge current Ij flows from the power supply VD through the enhancement type n-channel MOS transistor Q1 to the capacitor C, and the capacitor C is charged while no light signal Ls is detected (the photodiode PD is not activated). Therefore, the detection voltage Vd at the sensor detection terminal P increases to a value near the voltage of the power supply VD, which value represents the initial condition of the photodiode PD, i.e., no light signal detection.

The detection voltage Vd in this initial condition (i.e., the initial value) is set to a value smaller than the voltage of the power supply VD (e.g., 4.5 volts). The reason is that while the capacitor C is being charged, as the detection voltage Vd at the sensor detection terminal P increases near the voltage of the power supply VD, the voltage V (GS) between the gate G and the source S (this voltage equals the voltage V(SD) between the drain D and the source S) of the enhancement type n-channel MOS transistor Q1 decreases. As a result, the impedance between the drain D and the source S increases rapidly, thereby reducing the charge current Ij.

When the photodiode PD of the photosensor circuit 100 in the initial condition detects the light signal Ls, the ,sensor current Id flows through the photodiode PD. As a result, the detection voltage Vd at the sensor detection terminal P decreases logarithmically to a value lower than the initial value in correspondence with the impedance between the drain D and the source S of the enhancement type n-channel MOS transistor Q1 as the intensity of the light signal Ls increases. By measuring the absolute value of this voltage drop in the detection voltage Vd, the light signal Ls is detected. While the sensor current Id through the photodiode PD is proportional to the intensity of the light signal Ls, the detection voltage Vd at the sensor detection terminal P provides the light signal Ls which is generated in a logarithmic conversion because the detection voltage Vd is a value that is a product of the sensor current Id multiplied by the logarithmic impedance of the MOS transistor between the drain D and the source S.

FIG. 7 shows the characteristic relation between the sensor current Id and the detection voltage Vd. As shown in the figure, the value (initial value) of the detection voltage Vd near the initial condition of the photosensor circuit 100

(when the sensor current Id is about $10^{-12}$ ampere) is, for example, 4.5 volts. When the sensor current Id increases by an order of magnitude of five digits (when the sensor current Id is about $10^{-7}$ ampere), the detection voltage Vd becomes 42 volts. In this way, the photosensor circuit 100 detects the change of the light signal in a range of five-digit magnitude (i.e., 100,000-fold change) as a change of 0.3 volts in the detection voltage Vd. Therefore, this photosensor circuit has a wide dynamic range for the input light signal Ls.

However, this photosensor circuit 100 has a problem of insufficient sensitivity. When the light signal Ls is minute, and the sensor current Id is minuscule (Id =$10^{-12}$–$10^{-11}$), the change of the detection voltage Vd is too small to be detectable because the logarithmic conversion of the sensor current Id to the detection voltage Vd is executed for the whole range of the light signal.

As mentioned previously, when the light signal Ls is terminated, and the photodiode PD is turned off, the charge current Ij flows to the capacitor C, increasing the detection voltage Vd at the sensor detection terminal P. However, as the impedance between the drain D and the source S of the enhancement type n-channel MOS transistor Q1 increases rapidly, the detection voltage Vd never increases beyond a predetermined value (4.5 volts). FIG. 8 shows the chronological characteristic of the ascending detection voltage Vd in a broken line L (100). As seen from the characteristic curve, after the turn-off of the photodiode PD, as the detection voltage Vd approaches the predetermined value, the rate of increase of the detection voltage Vd decreases. Thus, a substantial time must elapse before the detection voltage Vd reaches the predetermined value (4.5 volts).

If a plurality of photosensor circuits 100 of this type are arranged in a matrix to compose an image sensor, then the resultant image sensor experiences a problem of after-image. When the image sensor is reset to the initial condition, a relatively long time must elapse for the detection voltage Vd to return to the predetermined value (4.5 volts) as mentioned above. This slow response of the circuits causes the appearance of a residual image on the image sensor.

Also, the photosensor circuit 100 is prone to sensitivity softening. As the enhancement type n-channel MOS transistor Q1 and the capacitor C also work for noise as a peak hold circuit, the circuit mistakenly recognizes a noise which has a large amplitude as a light signal Ls. This condition lowers the SN ratio, and the lowest detectable intensity is impaired by noise. Thus, the sensitivity of the circuit is softened.

To solve these problems, the applicant of the present invention has invented a photosensor circuit which is capable of detecting a substantially weak light signal, which is not prone to generate a residual image, and which has a high SN ratio (see co-pending U.S. patent application Ser. No. 08/925,852, filed on Sep. 9, 1997, now U.S. Pat. No. 5,861,621, and Japanese Patent Application No. H8-239503). FIG. 9 show this photosensor circuit 200, which differs from the above mentioned photosensor circuit 100 on the following points. The drain D of the enhancement type n-channel MOS transistor Q1 is connected to a constant-voltage power supply VD (e.g., 5 volts), and the gate G thereof is connected to a gate-voltage power supply VG, which is capable of supplying two, high and low gate voltages.

In this photosensor circuit 200, the gate G of the enhancement type n-channel MOS transistor Q1 is supplied with a high voltage VH which is substantially higher than the drain voltage VD (i.e., 5 volts) and a low voltage VL which is equal to or lower than the drain voltage VD as the gate voltage VG in the timing shown in FIG. 10. When the high voltage VH is applied as the gate voltage VG, the impedance between the drain D and the source S of the enhancement type n-channel MOS transistor Q1 drops into a low impedance condition. As a result, the capacitor C is charged rapidly, so the detection voltage Vd at the sensor detection terminal P increases to a value (e.g., 4.95 volts) which is almost equal to the drain voltage VD (i.e., 5 volts) as shown by the real line L (200) in FIG. 8. If a plurality of photosensor circuits 200 of this type are arranged in a matrix to compose an image sensor, then the resultant image sensor is not affected by a problem of after-image because the detection voltage Vd returns quickly to the predetermined value (4.95 volts) in response to the resetting of the image sensor.

For the photosensor circuit 200 to detect a light signal, the gate voltage VG is set to the low voltage VL to bring the enhancement type n-channel MOS transistor Q1 into its weakly reversed condition. In this condition, when the photodiode PD is exposed to the light, the electrical charge stored in the capacitor C is discharged. Here, if the intensity of the light hitting the photodiode PD is relatively low, then the sensor current Id does not flow much. Therefore, the enhancement type n-channel MOS transistor Q1 stays in a high impedance condition, so mainly the electrical charge of the capacitor C is used for this small current. As a result, the change of the output voltage is linear. However, in correspondence with the increasing intensity of the light, to which the photodiode PD is exposed, the change of the detection voltage Vd is altered in such a way as shown by an arrow in FIG. 10. If the intensity of the light is relatively high, then the electrical charge of the capacitor C is consumed quickly. As a result, the sensor current Id, which flows through the photodiode PD, is now supplied through the enhancement type n-channel MOS transistor Q1. In this condition, the change of the detection voltage Vd is logarithmic.

This characteristic of the photosensor circuit 200 is shown in FIG. 11. While the intensity of the light is relatively low, the sensor current Id is in a range of $10^{-12}$ to $10^{-11}$. In this condition, the electrical charge of the capacitor C is discharged, and the detection voltage Vd changes linearly. When the intensity of the light is high, and the sensor current Id is in a range above a value of $10^{-11}$, the detection voltage Vd changes logarithmically. In summary, this photosensor circuit 200 provides a linear output characteristic which is equivalent to that of an ordinary MOS type element when the intensity of the light is relatively low (i.e., the sensor current Id is small), and it provides a logarithmic output characteristic which is equivalent to that of a logarithmic type element when the intensity of the light becomes higher (i.e., the sensor current Id becomes relatively large). Thus, this photosensor circuit takes advantage of a cumulative effect when the sensor current is small. Thereby, it realizes high sensitivity and solves the problem of bad SN ratio which affects a logarithmic type element in an insufficient light intensity.

However, this photosensor circuit 200 has a disadvantage of requiring a large number of voltage sources, namely, the high and low voltage sources, which supply the high voltage VH and the low voltage VL to the gate of the enhancement type n-channel MOS transistor Q1 as the gate voltage VG, and the other voltage sources which supply the drain voltage VD for the enhancement type n-channel MOS transistor Q1 and the drain voltage VDD and the gate voltage VC for the enhancement type n-channel MOS transistor Q3. Therefore, the photosensor circuit 200 is complicated in its design.

SUMMARY OF THE INVENTION

The present invention has been conceived to solve the above mentioned problem. It is an object of the present invention to provide a photosensor circuit which is capable of detecting a minute light signal in high precision and to provide an image sensor which utilizes such photosensor circuits.

It is another object of the present invention to provide a photosensor circuit which is not prone to after-image phenomenon and to provide an image sensor which utilizes such photosensor circuits.

It is yet another object of the present invention to provide a photosensor circuit which has a high SN ratio and to provide an image sensor which utilizes such photosensor circuits.

It is still another object of the present invention to provide a photosensor circuit which requires a small number of power sources and to provide an image sensor which utilizes such photosensor circuits.

In order to attain these objectives, the present invention provides a photosensor circuit which comprises light-electricity converting means (e.g., a photodiode PD in an embodiment), an n-channel MOS transistor (QD1), a capacitor (C) connected to a detection terminal of the n-channel MOS transistor, and initializing means (a gate voltage power source VG or a timing regulator 21 in an embodiment). The light-electricity converting means converts a light signal into electricity, and the n-channel MOS transistor has a logarithmic characteristic in its weakly reversed condition and converts a sensor current generated by the light- electricity converting means into a detection voltage that has a logarithmic characteristic. The initializing means applies a reset voltage (VS) to the gate of the n-channel MOS transistor for the purpose of lowering the impedance between the drain and the source of the transistor and thereby controls the charging and discharging of the capacitor. In this photosensor circuit, the n-channel MOS transistor comprises a depletion type n-channel MOS transistor, which has a logarithmic characteristic in its weakly reversed condition without a gate voltage being applied.

In this photosensor circuit, as the depletion type n channel MOS transistor has a logarithmic characteristic in its weakly reversed condition while no gate voltage is applied (VG =0 condition), the detection of the incident light is executed in a logarithmic fashion. As a result, this photosensor circuit offers a wide dynamic range for the output with respect to the input. While the light signal is weak, and the sensor current does not flow much through the light-electricity converting means (photodiode), the transistor stays in a high impedance condition. In this condition, the electrical charge of the capacitor is used, changing the output voltage linearly with respect to the incident light, so even a faint light can be detected in high sensitivity. In this detection of the light, the electrical discharge of the capacitor is measured, so the detection is accumulative. Therefore, the photosensor circuit is relatively immune to peaking noises and has a high SN ratio.

By applying a reset voltage (VG=VS) to the gate of the depletion type n-channel MOS transistor, a low impedance condition is achieved between the drain and the source of the transistor. In this condition, the capacitor is rapidly charged for the resetting of the circuit into an initial condition. The reset voltage as the gate voltage (VG=VS) is applied only when the circuit is reset, and no voltage (VG=0) is applied during the detection period. Therefore, only one type of power source is required for the gate voltage of the depletion type n-channel MOS transistor, so the design of the photosensor circuit is relatively simple because the number of power sources required is smaller than that for a conventional photosensor circuit.

An image sensor according to the present invention is composed of a plurality of photosensor circuits which are described above, and these photosensor circuits are arranged in an array. In this image sensor, each column of photosensor circuits in the array comprises an extraction line through which an extraction signal is sent to extract detection signals from the photosensor circuits belonging to each respective column in the array and a reset line through which a reset signal is sent to reset the photosensor circuits belonging to each respective column in the array into an initial condition. Furthermore, each of the extraction lines is connected to one of the reset lines which is located adjacent to each respective extraction line on a side opposite to an extraction scanning direction.

In this image sensor, when the extraction signal is sent to an extraction line, this same signal is sent as the reset signal to the reset line which is connected with this respective extraction line. As a result, while the detection voltages are extracted from a column of photosensor circuits in the scanning operation, the photosensor circuits belonging to the column which is adjacent to this respective extraction line and opposite to the scanning direction are reset at the same time. In other words, while the detection voltages are extracted from each column of photosensor circuits sequentially in the scanning operation, the columns of photosensor circuits which have been scanned are sequentially reset at the same time. In this way, one signal triggers the extraction of the detection signals from a column of photosensor circuits and the resetting of the adjacent column at the same time, so the control of the image sensor is relatively simple.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
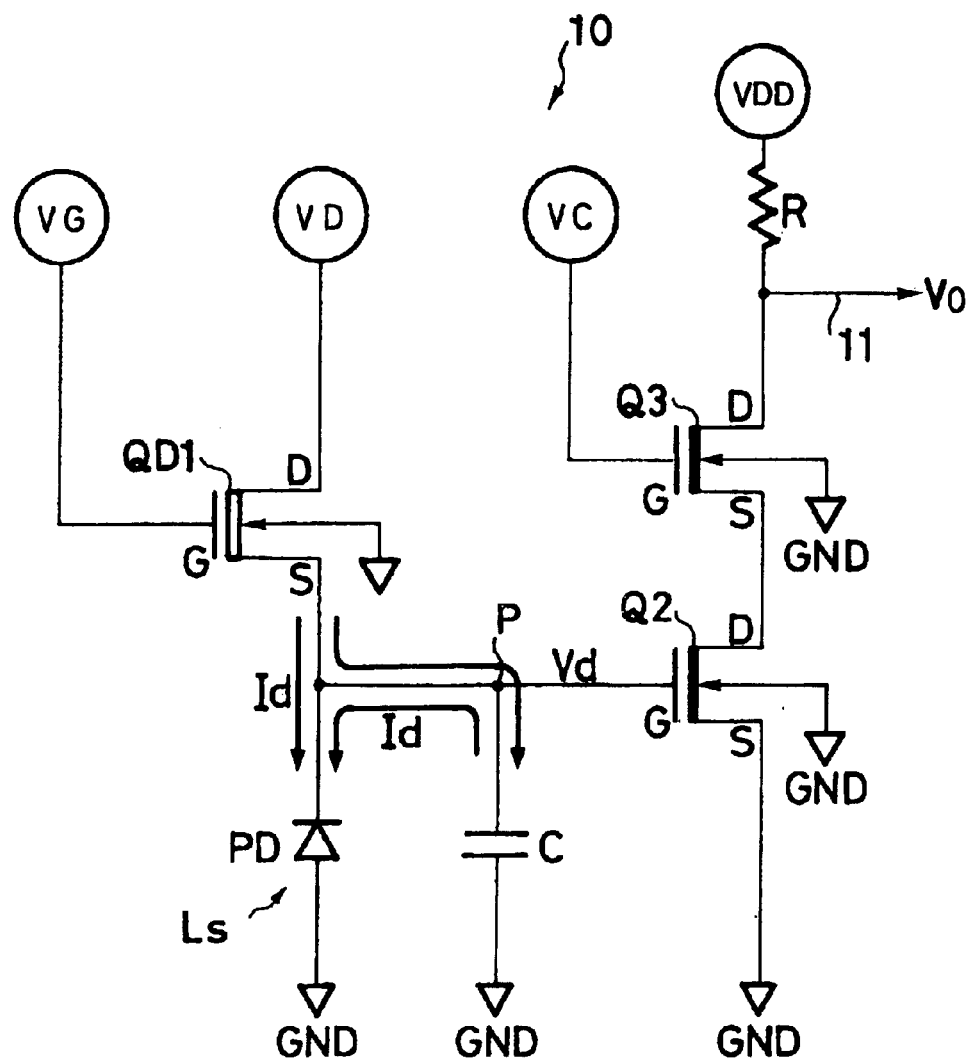
FIG. 1 is a schematic circuit diagram, showing the construction of a photosensor circuit according to the present invention.

FIG. 1 shows the construction of a photosensor circuit 10 according to the present invention. This photosensor circuit 10 comprises a photodiode PD, a depletion type n-channel MOS transistor QD1 connected in series with the photodiode PD, an enhancement type n-channel MOS transistor Q2 whose gate is connected to the junction point P (sensor detection terminal) of the photodiode PD and the depletion type n-channel MOS transistor QD1, and an enhancement type n-channel MOS transistor Q3 connected in series with this enhancement type n-channel MOS transistor Q2. In addition, a capacitor C is connected to the junction point P. The parasitic capacitance of this capacitor is a composite value of stray capacitance created in the photodiode PD, the depletion type n-channel MOS transistor QD1, the enhancement type n-channel MOS transistor Q2, and the wires which interconnect these components.

A light signal Ls is detected at the photodiode PD and converted to a sensor current Id whose magnitude is proportional to the intensity of the light signal Ls. The depletion type n-channel MOS transistor QD1, which defines a load for the photodiode PD, converts the sensor current Id generated by the photodiode PD to a corresponding voltage which is detectable at the sensor detection terminal P as "detection voltage Vd".

In this condition, the depletion type n-channel MOS transistor QD1 in its weakly reversed condition while the sensor current Id is relatively small, provides a MOS transistor resistance that has a logarithmic characteristic, such that the sensor current Id is converted to the detection voltage Vd in accordance with a logarithmic function. Therefore, even if the intensity of the light signal Ls changes greatly, thereby changing the sensor current Id greatly (in an exponential magnitude), the change of the detection voltage Vd is kept relatively small, so this logarithmic conversion never experiences saturation. As a result, the dynamic range of the output is substantially wide with respect to the variation of the input intensity.

Furthermore, the enhancement type n-channel MOS transistor Q2, which defines an output transistor, performs a voltage-current conversion through which the detection voltage Vd is output from the photosensor circuit 10 as a sensor current signal. The enhancement type n-channel MOS transistor Q3 functions as a switch to connect or cut the line of this sensor current signal, which is generated at the enhancement type n-channel MOS transistor Q2, to an external circuit.

Figure 6:
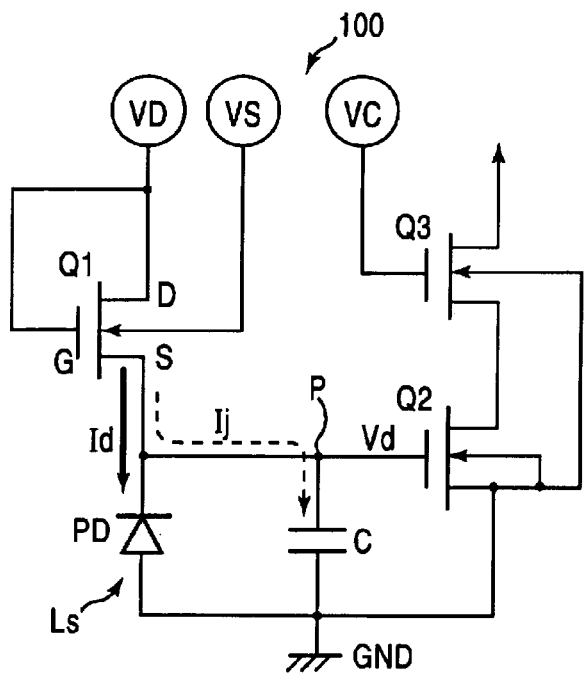
FIG. 6 is a schematic circuit diagram, showing the construction of an prior-art photosensor circuit.
Figure 7:
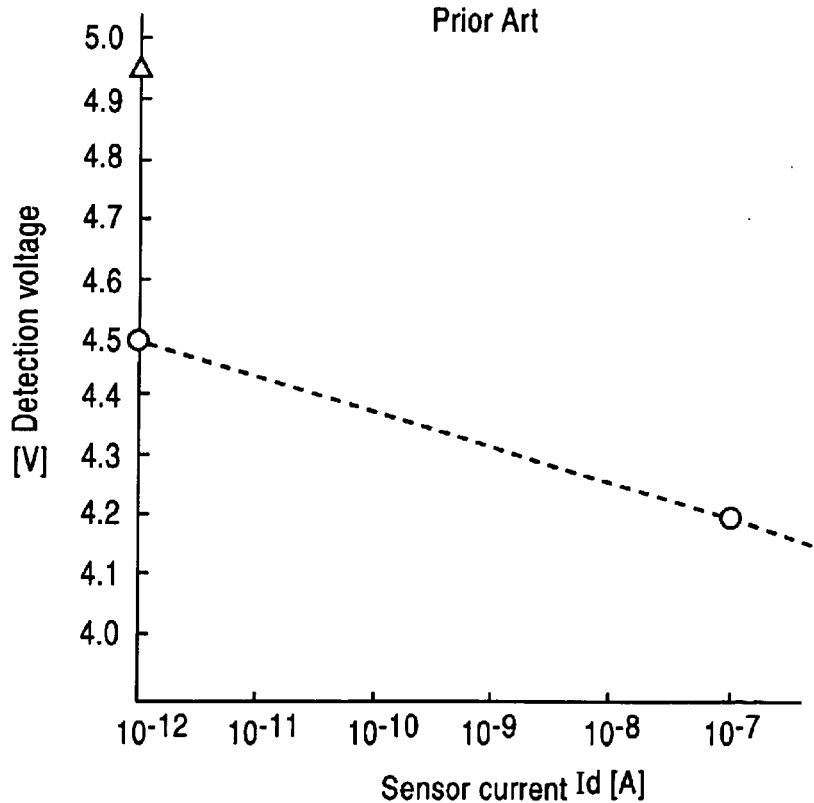
FIG. 7 is a graph, showing the relation of the sensor current Id to the detection voltage Vd of the prior-art photosensor circuit.

As mentioned previously, the transistor QD1 of the photosensor circuit 10 is of a depletion type while the transistors Q2 and Q3 are of an enhancement type. These types of transistors have some differences, which are now described with reference to FIG. 2. In the figure, the real line indicates the characteristic of the depletion type n-channel MOS transistor QD1 while the chain line indicates the characteristic of the enhancement type n-channel MOS transistors Q2 and Q3 (and the enhancement type n-channel MOS transistors Q1 which are used in the prior-art photosensor circuits shown in FIG. 6 and FIG. 9). As seen from these characteristic lines, the enhancement type n-channel MOS transistors Q1, Q2 and Q3 do not output any current as the sensor current Id when the gate voltages VG of the respective transistors equal zero (VG=0), so they remain in OFF condition. On the other hand, the depletion type n-channel MOS transistor QD1 acquires a weakly reversed condition when the gate voltage VG equals zero (VG=0).

Figure 9:
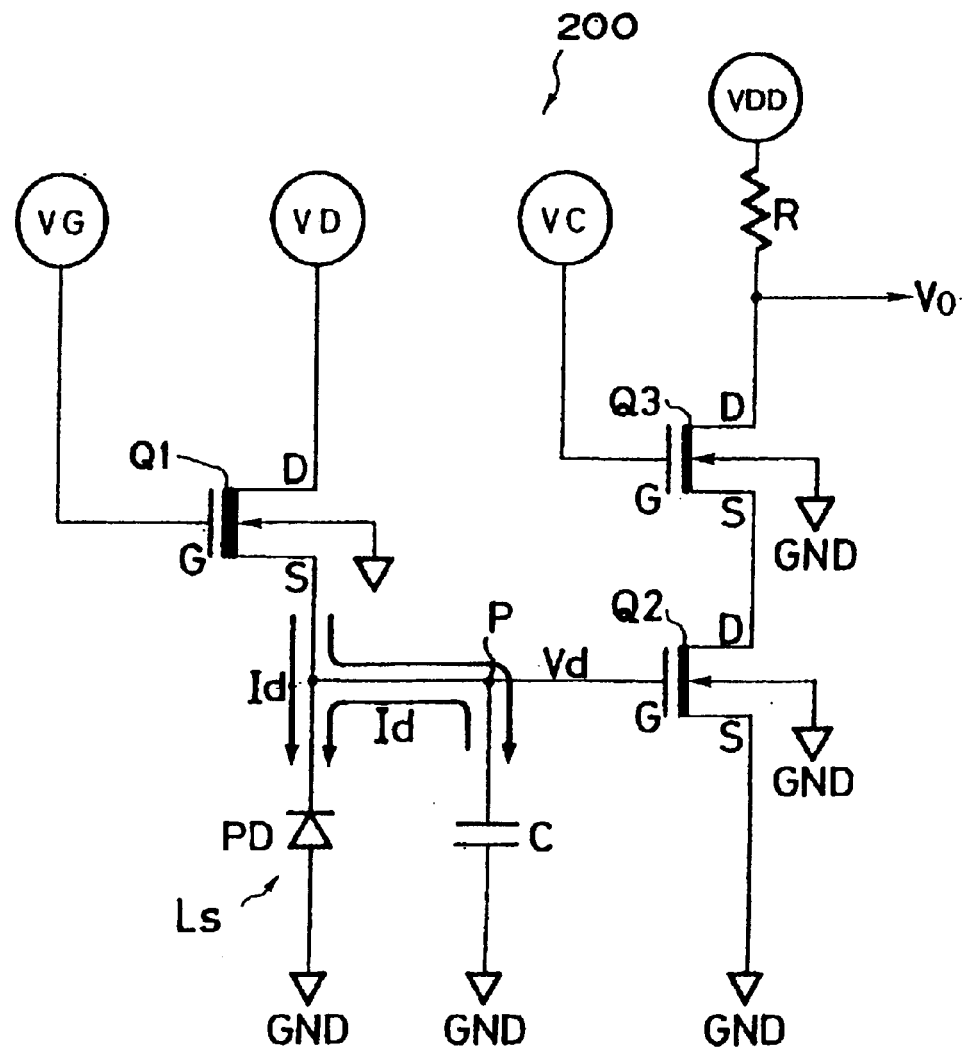
FIG. 9 is a schematic circuit diagram, showing the construction of a photosensor circuit which has a problem that is to be solved by the present invention.
Figure 10:
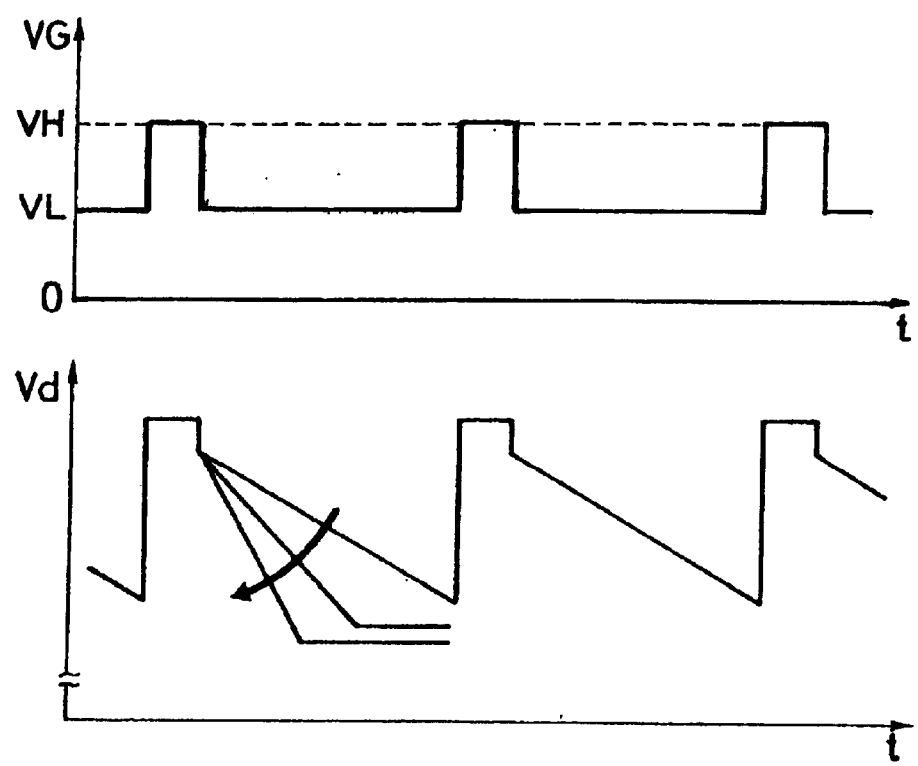
FIG. 10 is a graph, showing the chronological change of the gate voltage VG (fetched signal) and the detection voltage Vd of the photosensor circuit shown in FIG. 9.

More specifically, the condition in which the gate voltage VG of the depletion type n-channel MOS transistor QD1 equals zero (VG=0) is identical with the condition of the prior-art photosensor circuit shown in FIG. 9 in which the low voltage VL is applied to the gate of the enhancement type n-channel MOS transistor Q1. Furthermore, when the gate voltage VG of the depletion type n-channel MOS transistor QD1 equals a predetermined voltage VS in the figure (VG=VS), the transistor QD1 acquires a low resistance between the drain D and the source S. This condition is identical with the condition of the prior-art photosensor circuit shown in FIG. 9 in which the high voltage VH is applied to the gate of the enhancement type n-channel MOS transistor Q1.

Figure 2:
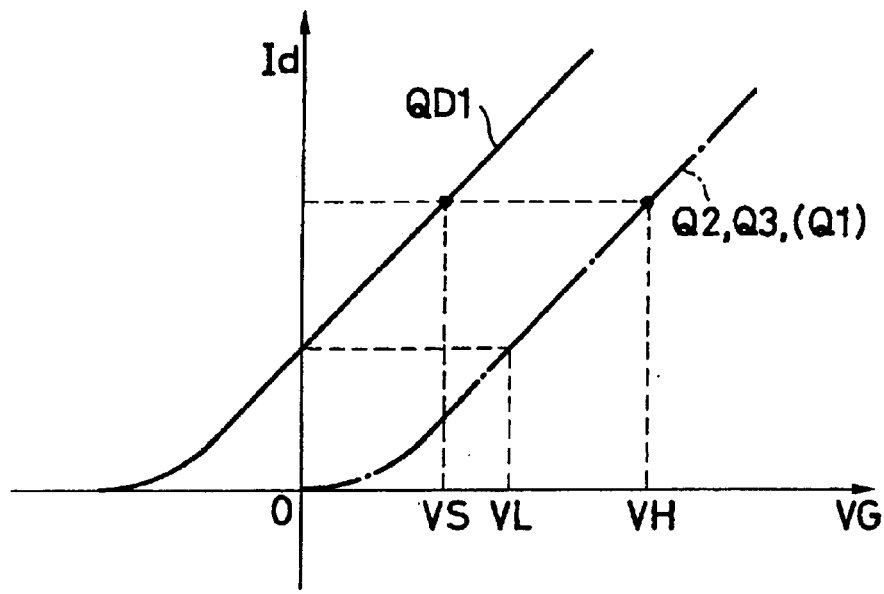
FIG. 2 is a graph, showing the characteristics of the transistors which compose this photosensor circuit.
Figure 3:
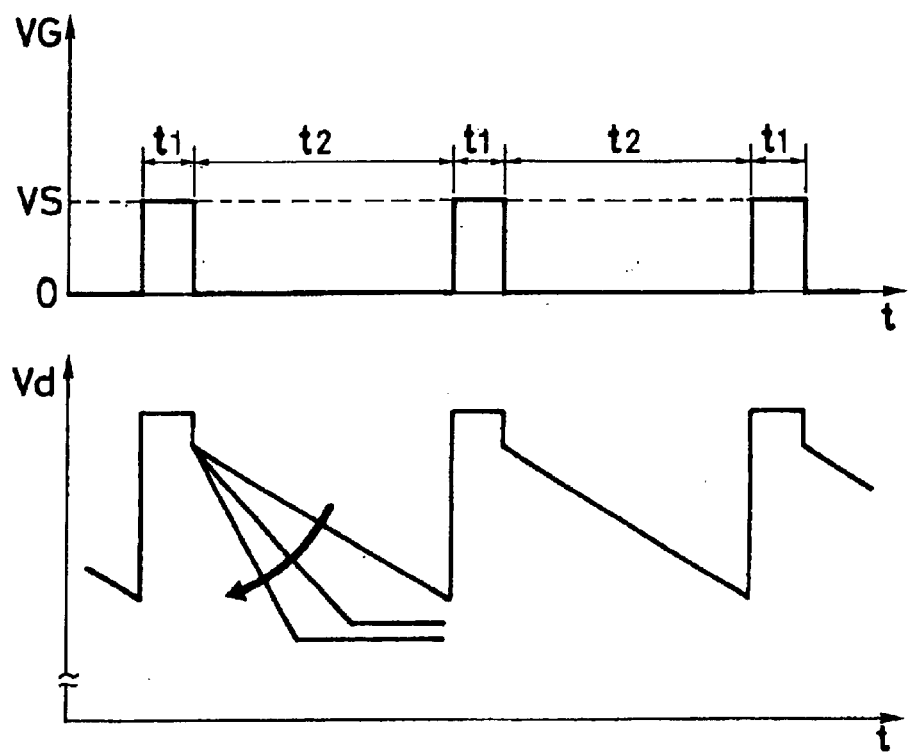
FIG. 3 is a graph, showing the chronological change of the gate voltage VG (fetched signal) and the detection voltage Vd of the photosensor circuit.
Figure 8:
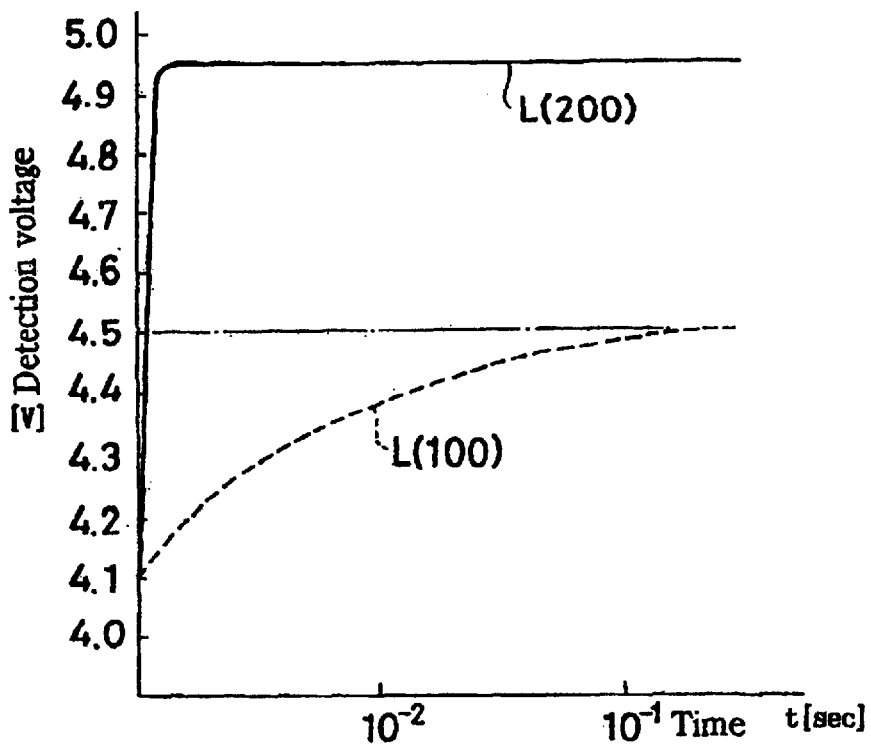
FIG. 8 is a graph, showing the chronological change of the detection voltage Vd of the prior-art photosensor circuit.

In this photosensor circuit 10, the predetermined voltage VS for the gate voltage VG (VG=VS), which is illustrated in FIG. 2, is applied for a short period of time t1 as a signal voltage to reset the circuit in accordance with the timing shown in FIG. 3. When the predetermined voltage VS is set as the gate voltage VG, the impedance between the drain D and the source S of the depletion type n-channel MOS transistor QD1 acquires a low impedance condition. As a result, the capacitor C is charged rapidly, so the detection voltage Vd at the sensor detection terminal P increases to a value (e.g., 4.95 volts) which is almost equal to the drain voltage VD (i.e., 5 volts) as shown by the real line L(200) in FIG. 8. Therefore, if a plurality of photosensor circuits 10 are arranged in a matrix to compose an image sensor, then the resultant image sensor will not be affected by any after-image because the detection voltage Vd is quickly reset to the predetermined value (4.95 volts) in response to the resetting of the image sensor.

After the resetting of the drain voltage VD, the, gate voltage VG of the photosensor circuit 10 is set to zero (VG=0) for a period t2, during which the circuit can detect a light signal. In this condition, the depletion type n-channel MOS transistor QD1 is weakly reversed. Therefore, if the photodiode PD is exposed to any incident light, the electrical charge stored in the capacitor C is discharged. Here, if the intensity of the light hitting the photodiode PD is relatively low, then the sensor current Id does not flow much. Therefore, the depletion type n-channel MOS transistor QD1 stays in a high impedance condition, so mainly the electrical charge of the capacitor C is used for this small current. As a result, the change of the output voltage Vd is linear because it corresponds to the discharge of the capacitor C. Here, the detection of the output voltage Vd is performed by measuring the amount of the discharge accumulated during the detection period t2. This detection is immune to any noise which may peak during the detection period, so this photosensor circuit offers a high SN ratio.

However, as the intensity of the light incident to the photodiode PD increases, the change of the detection voltage Vd is altered in such a way as shown by an arrow in FIG. 3. If the intensity of the light is relatively high, then the electrical charge of the capacitor C is consumed quickly. As a result, the sensor current Id, which flows through the photodiode PD, is now supplied through the depletion type n-channel MOS transistor QD1. In this condition, the change of the detection voltage Vd is logarithmic.

Figure 11:
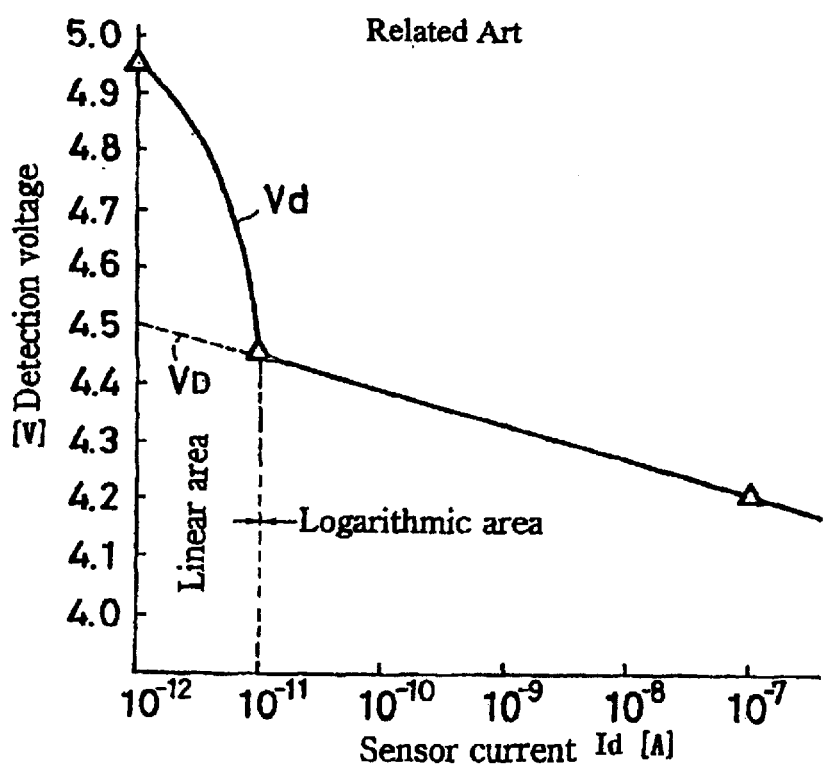
FIG. 11 is a graph, showing the relation of the sensor current Id to the detection voltage Vd of the photosensor circuit shown in FIG. 9.

This relation between the detection voltage Vd and the sensor current Id of the photosensor circuit 10 is shown in FIG. 11, which relation is the same as that of the photosensor circuit 200 shown in FIG. 9. In the photosensor circuit 10, the sensor current Id remains in a range of $10^{-12}$ to $10^{-11}$ while the intensity of the light is relatively low. In this condition, the electrical charge of the capacitor C is discharged, and the detection voltage Vd changes linearly. However, when the intensity of the light is high, and the sensor current Id is in a range above a value of $10^{-11}$, the detection voltage Vd changes logarithmically. In summary, this photosensor circuit 10 provides a linear output characteristic which is equivalent to that of an ordinary MOS type element when the intensity of the light is relatively low (i.e., when the sensor current Id is small), and it provides a logarithmic output characteristic which is equivalent to that of a logarithmic type element when the intensity of the light becomes higher (i.e., when the sensor current Id becomes relatively large). Thus, this photosensor circuit takes advantage of a cumulative effect when the sensor current is small. Thereby, it realizes high sensitivity and solves the problem of low SN ratio which affects a logarithmic type element in an insufficient light intensity.

In this photosensor circuit 10, the enhancement type n-channel MOS transistor Q2 performs a voltage-current conversion on the detection voltage Vd, which output is taken out as detection voltage Vo to an output line 11 in accordance with the switch timing which is set by the enhancement type n-channel MOS transistor Q3.

This photosensor circuit 10 comprises, as power sources, a constant voltage supply VD (5 volts) and a gate voltage supply VG (i.e., VS) which is applied in the timing shown in FIG. 3 for the depletion type n-channel MOS transistor QD1, as well as a drain voltage supply VDD (5 volts) for the enhancement type n-channel MOS transistors Q2 and Q3 and a gate voltage supply VC for the gate of the enhancement type n-channel MOS transistor Q3. The voltage sources VD, VDD and VC of the photosensor circuit 10 are identical with those of the photosensor circuit 200. However, as for the gate voltage VG, this photosensor circuit 10 according to the present invention requires only one voltage VS while the photosensor circuit 200 shown in FIG. 9 requires two voltages, i.e., high and low voltages VH and VL. With a comparatively small number of power sources required, the construction of the photosensor circuit 10 according to the present invention is relatively simple.

Figure 4:
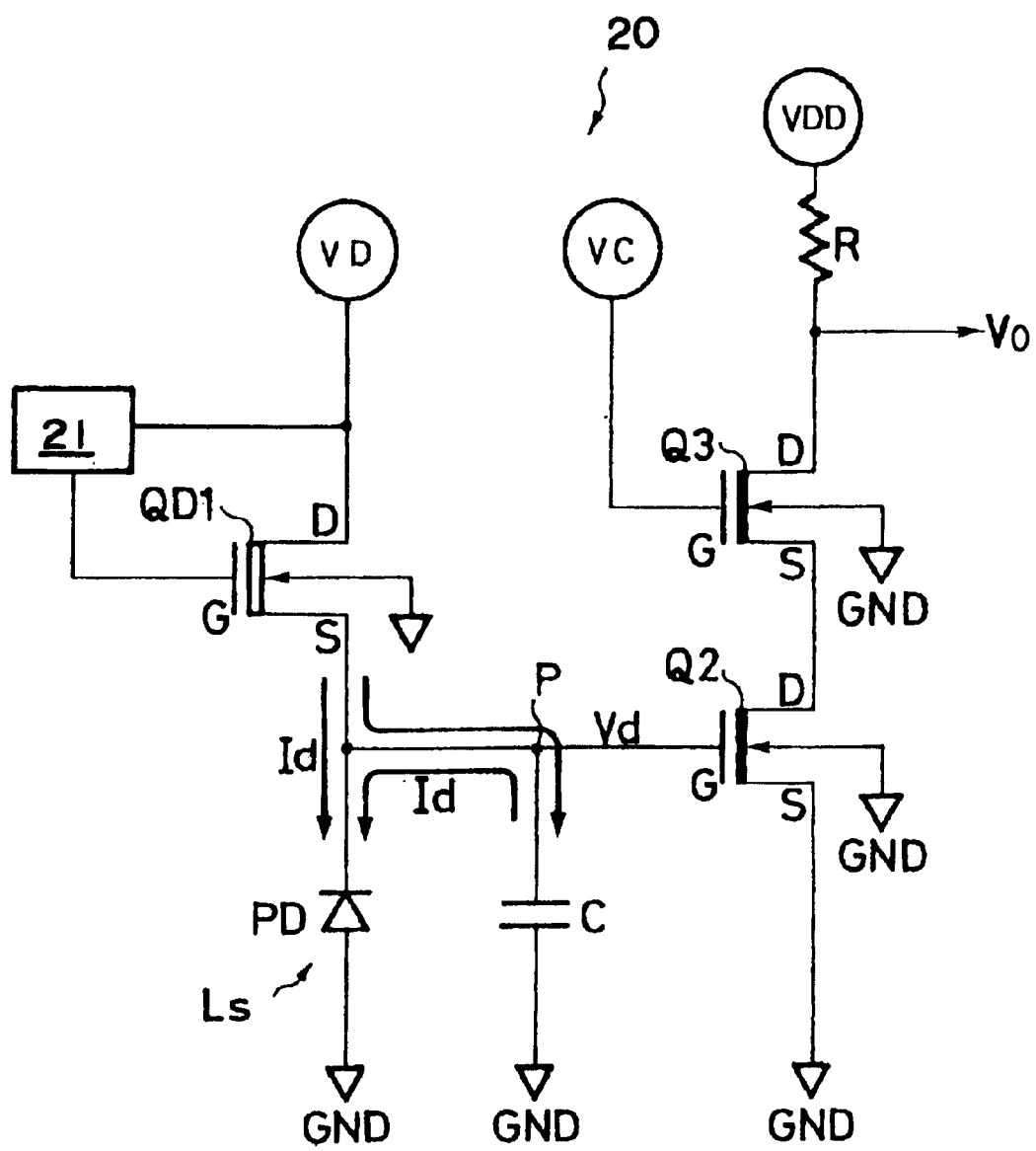
FIG. 4 is a schematic circuit diagram, showing the construction of another photosensor circuit as another embodiment according to the present invention.

FIG. 4 shows another embodiment of photosensor circuit according to the present invention. This photosensor circuit 20 differs from the photosensor circuit 10 shown in FIG. 1 only on the following point. The drain voltage VD is connected to the gate of the depletion type n-channel MOS transistor QD1 through a timing regulator 21.

This photosensor circuit 20 utilizes the power source of the drain voltage VD also as the source for the gate voltage VG of the depletion type n-channel MOS transistor QD1. For this purpose, the timing regulator 21 controls the application of the drain voltage VD to the gate of the respective transistor during the time t1 in the timing shown in FIG. 3. As the depletion type n-channel MOS transistor QD1 has a characteristic that the drain voltage VD equals the predetermined voltage VS shown in FIG. 2. When the drain voltage VD is applied as the gate voltage VG, the impedance between the drain D and the source S of the depletion type n-channel MOS transistor QD1 acquires a low impedance condition. As a result, the capacitor C is charged rapidly, so the detection voltage Vd at the sensor detection terminal P increases to a value (e.g., 4.95 volts) which is almost equal to the drain voltage VD (i.e., 5 volts), and the circuit is reset.

After the resetting, the gate voltage VG is set to zero (VG=0) by the timing regulator 21 to provide a detection period t2. In this condition, the depletion type n-channel MOS transistor QD1 is weakly reversed as shown in FIG. 2, and this photosensor circuit 20 is ready to detect any incident light in the same way as the photosensor circuit 10.

This photosensor circuit 20 comprises a relatively small number of power sources, requiring only three kinds of power sources, namely, VD, VC and VDD.

Figure 5:
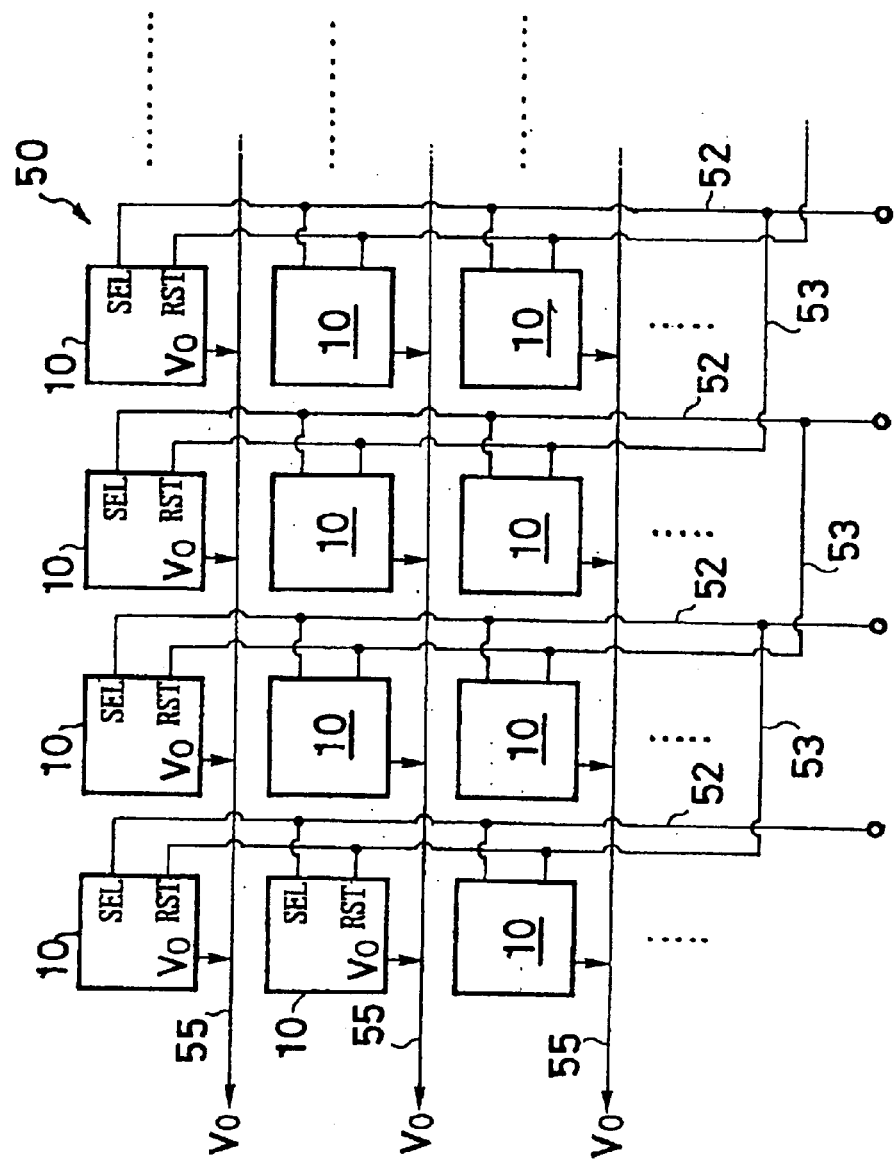
FIG. 5 is a schematic diagram, showing the construction of an image sensor according to the present invention.

A plurality of photosensor circuits 10 (20) of the present invention are arranged in a matrix to construct an image sensor 50, which is shown in FIG. 5. The photosensor circuits 10 (i.e., pixels) of the image sensor 50 are arrayed in a square or a rectangle on a plane. In the figure, the constant voltage power supplies VD and VDD are not shown.

In this image sensor 50, image detection is performed by extracting the detection voltage Vo from each pixel 10 belonging to a vertical scanning line to a respective detection line 55 at a time and by repeating this extraction for each vertical scanning line. Each of these detection lines is the output line 11 shown in FIG. 1. The extraction of the detection voltages Vo from the photosensor circuits is executed by applying a switching voltage VC in a predetermined timing, and after the extraction, the gate voltage VG which equals the predetermined voltage VS is applied to the gates of the depletion type n-channel MOS transistors QD1 in each vertical scanning line for resetting.

In FIG. 5, the terminal of each pixel 10 which receives the switching voltage VC applied for the extraction of the detection voltage Vo is marked with "SEL", and the terminal which receives the gate voltage applied for the resetting of the pixel is marked with "RST". The extraction signal terminals SEL of the pixels belonging to a vertical scanning line are connected to an extraction signal line 52 while the reset signal terminals RST thereof are connected to a reset signal line 53. Furthermore, each extraction signal line 52 for the pixels belonging to a respective vertical scanning line is also connected with the reset signal line 53 which is connected to the terminals RST of the pixels that are located adjacently on the left side of the respective vertical scanning line as shown in the figure.

In the scanning operation of this image sensor 50, the detection voltages Vo are extracted from the pixels by applying the extraction signal (i.e., the switching voltage VC) to each extraction signal line 52 sequentially rightwards, starting from the line located at the left end. Thus, the image detection is executed by scanning the columns of pixels, one after another, rightwards from the left. More specifically, after the extraction of the detection voltages Vo from the first column of pixels from the left end is completed, the extraction signal is applied to the extraction signal line 52 of the second column of pixels for the extraction of the detection signals from the second column of pixels. At this time, because the extraction signal line 52 is connected to the reset signal line 53 provided for the first column of pixels, the reset signal is applied to the reset signal line 53 connected to the first column of pixels on the left side, resetting all the pixels in the first left column in preparation for the next incident light detection. In the same way, during the extraction of the detection signals from the following column of pixels, the pixels in the column immediately on the left side are reset at the same time. The detection and resetting of the detection signals are executed at the end of the time t2 shown in FIG. 3.

With this construction, one signal can represent both the extraction signal and the reset signal, making the control of the image sensor relatively simple.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 10-067979 filed on Mar. 18, 1998, which is incorporated herein by reference.

What is claimed is:

1. A photosensor circuit comprising:

light-electricity converting means which converts a light signal into electricity, an n-channel MOS transistor which has a logarithmic characteristic in its weakly reversed condition and converts a sensor current generated by said light-electricity converting means into a detection voltage which has a logarithmic characteristic, a capacitor which in connection to a detection terminal of said n-channel MOS transistor, and initializing means which applied to reset voltage to a gate of said n-channel MOS transistor, thereby lowering an independence between a drain and a source to control charging and discharging of said capacitor; wherein an n-channel MOS transistor is a depletion type n-channel MOS transistor (QD1), which has a logarithmic characteristic in its weakly reversed condition and stays in a high impedance condition without a gate voltage being applied; and a low impedance condition is created between the drain and the source of said depletion type channel MOS transistor (QD1) when a drain voltage (VD) or a predetermined voltage (VS) lower than the drain voltage (VD) is applied as the gate voltage (VG) for said depletion type n-channel MOS transistor (QD1).

2. The photosensor circuit set forth in claim 1, further comprising a constant voltage power supply (VD) which provides a constant voltage to the drain of said depletion type n-channel MOS transistor (QD1) and a gate power supply (VG) which provides a predetermined voltage (VS) to the gate of said depletion type n-channel MOS transistor (QD1) in a predetermined timing.

3. The photosensor circuit set forth in claim 1 wherein said light-electricity converting means comprises a photodiode.

4. The photosensor circuit set forth in claim 1 wherein said capacitor is a capacitor whose parasitic capacitance is a composite value of stray capacitance created in said light-electricity converting means, said n-channel MOS transistor which are connected to a junction point of said capacitor and wires which interconnect these components.

5. The photosensor circuit set forth in claim 1, further comprising an enhancement type n-channel MOS transistor (QD2) which performs a voltage-current conversion to convert said detection voltage, which is converted by said depletion type n-channel MOS transistor QD1, into a sensor current.

6. The photosensor circuit set forth in claim 5, further comprising an enhancement type n-channel MOS transistor (Q3) which functions as a switch to connect or cut a line conducting said sensor current, which is converted by said enhancement type n-channel MOS transistor (Q2), to an external circuit.

7. The photosensor circuit set forth in claim 1, further comprising a constant voltage power supply (VD) which provides a constant voltage to the drain of said depletion type n-channel MOS transistor (QD1) and a timing regulator which provides a voltage from said constant voltage power supply (VD) to the gate of said depletion type n-channel MOS transistor (QD1) in a predetermined timing.

8. An image sensor composed of a plurality of photosensor circuits set forth in claim 1, said photosensor circuits being arranged in an array, wherein:

each column of said photosensor circuits in said array comprises an extraction line through which an extraction signal is sent to extract detection signals from said photosensor circuits belonging to each respective column in said array and a reset line through which a reset signal is sent to reset said photosensor circuits belonging to each respective column in said array into an initial condition; and each extraction line is connected to the reset line which is located adjacently on a side opposite to an extraction scanning direction.

9. The image sensor set forth in claim 8 wherein said reset lines are connected to a gate power source (VG) which supplies a predetermined voltage (VS) to the gate of said depletion type n-channel MOS transistor (QD1) composing each of said photosensor circuits, and said predetermined voltage (VS) is applied from said gate power source (VG) to said gate to reset said photosensor circuits into said initial condition.

10. The image sensor set forth in claim 8 wherein each of said extraction lines is connected to an enhancement type n-channel MOS transistor (Q2) and to an enhancement type n-channel MOS transistor (Q3), said enhancement type n-channel MOS transistor (Q2) performing a voltage-current conversion to convert said detection voltage into a sensor current, said detection voltage being converted by said depletion type n-channel MOS transistor (QD1) composing each of said photosensor circuits, said enhancement type n-channel MOS transistor (Q3) functioning as a switch to connect or cut a line conducting said sensor current to an external circuit, and said detection signal is extracted from each of said photosensor circuits by a switching action of said enhancement type n-channel MOS transistor (Q3).

* * * * *